(12) United States Patent
Larson

(10) Patent No.: US 9,083,863 B2
(45) Date of Patent: Jul. 14, 2015

(54) ALIGNMENT SYSTEM FOR A DIGITAL IMAGE CAPTURE DEVICE

(75) Inventor: David B Larson, Boise, ID (US)

(73) Assignee: HEWLETT-PACKARD DEVELOPMENT COMPANY, L.P., Houston, TX (US)

(*) Notice: Subject to any disclaimer, the term of this patent is extended or adjusted under 35 U.S.C. 154(b) by 735 days.

(21) Appl. No.: 13/451,772

(22) Filed: Apr. 20, 2012

(65) Prior Publication Data

US 2013/0278783 A1  Oct. 24, 2013

(51) Int. Cl.
| | | |
|---|---|---|
| G06K 9/68 | (2006.01) | |
| G06F 3/14 | (2006.01) | |
| H04N 1/195 | (2006.01) | |
| G06K 15/00 | (2006.01) | |

(52) U.S. Cl.
CPC .... *H04N 1/19594* (2013.01); *H04N 2201/0422* (2013.01); *H04N 2201/0436* (2013.01); *H04N 2201/0446* (2013.01); *H04N 2201/0448* (2013.01)

(58) Field of Classification Search
CPC ...................... Y10T 16/5326; Y10T 403/7011; Y10T 403/7054; E06B 1/6069; F16H 2057/0227; H04N 2201/0436; H04N 2201/0448; H04N 2201/0432; H04N 2201/0446; H04N 1/19594; H04N 5/232; G07D 7/20
USPC ........... 348/207.1, 207.2, 241, 86, 87, 94, 95, 348/208.4, 208.5, 208.7, E05.024, E05.078; 358/1.9, 2.1, 1.11–1.18, 3.21, 3.23, 358/3.24, 3.32, 505, 474; 384/602, 626
See application file for complete search history.

(56) References Cited

U.S. PATENT DOCUMENTS

| | | | | |
|---|---|---|---|---|
| 5,027,143 | A * | 6/1991 | Clark et al. ..................... | 396/89 |
| 5,463,363 | A * | 10/1995 | Ogawa ......................... | 335/299 |
| 7,090,324 | B2 | 8/2006 | Mizes | |
| 7,540,080 | B2 | 6/2009 | Fukunaga | |
| 7,847,938 | B2 | 12/2010 | Dohse | |
| 2006/0187432 | A1 | 8/2006 | Yasuda et al. | |
| 2008/0292177 | A1 | 11/2008 | Sheets et al. | |
| 2009/0251699 | A1 | 10/2009 | George | |
| 2012/0040490 | A1* | 2/2012 | Gallazzo et al. ................ | 438/87 |
| 2013/0271604 | A1* | 10/2013 | Follesa et al. ................. | 348/143 |

FOREIGN PATENT DOCUMENTS

JP   2009099318  A  *  5/2009

* cited by examiner

*Primary Examiner* — Chad Dickerson
(74) *Attorney, Agent, or Firm* — Tarolii, Sunheim, Covell & Tummino LLP

(57) ABSTRACT

A method for aligning an image capture device for a print device includes providing a capture stage on which an object to be imaged by the capture device is placed. The capture stage includes a plurality of reference markers spaced apart by a predetermined distance. The reference markers are imaged with the capture device. A distance between the reference markers is measured. A correction difference between the measured distance of the reference markers and the predetermined distance is computed. An angular correction value based on the correction difference is computed. The angular position of the capture device relative to the capture stage is adjusted based upon the angular correction value.

11 Claims, 10 Drawing Sheets

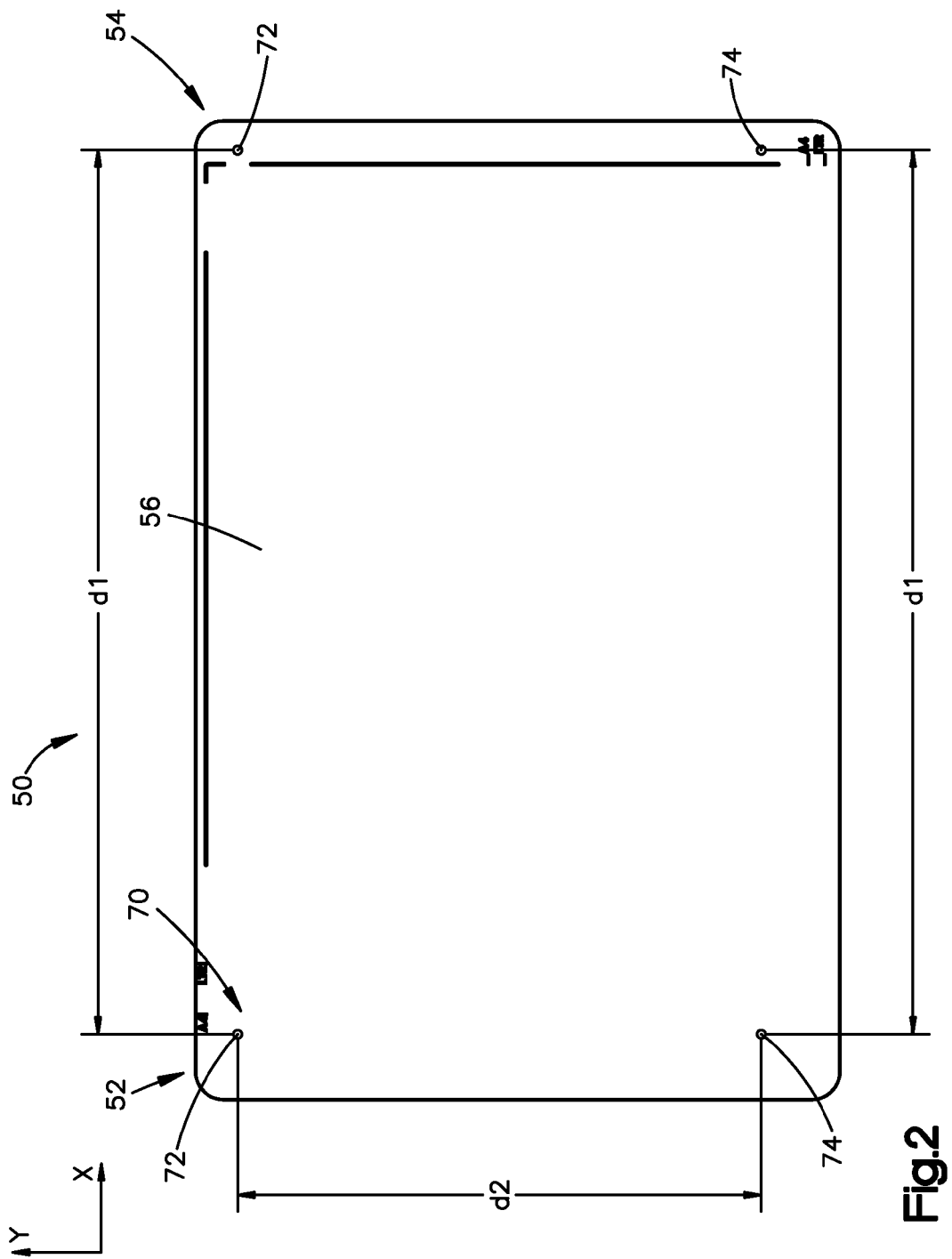

ALIGNMENT SYSTEM FOR A DIGITAL IMAGE CAPTURE DEVICE

BACKGROUND

In imaging and scanning applications it is important to ensure that documents, objects, etc., are photographed or scanned accurately and precisely. In some instances, the camera used to image the objects is mounted above a platform on which the objects are placed to be scanned. The camera is oriented such that the lens of the camera and the surface of the platform face towards each other, e.g., the camera lens faces downward and the platform surface faces upwards.

BRIEF DESCRIPTION OF THE DRAWINGS

FIG. 2 is a top view of a capture stage of the alignment device of FIG. 1.

DETAILED DESCRIPTION

Figure 1:
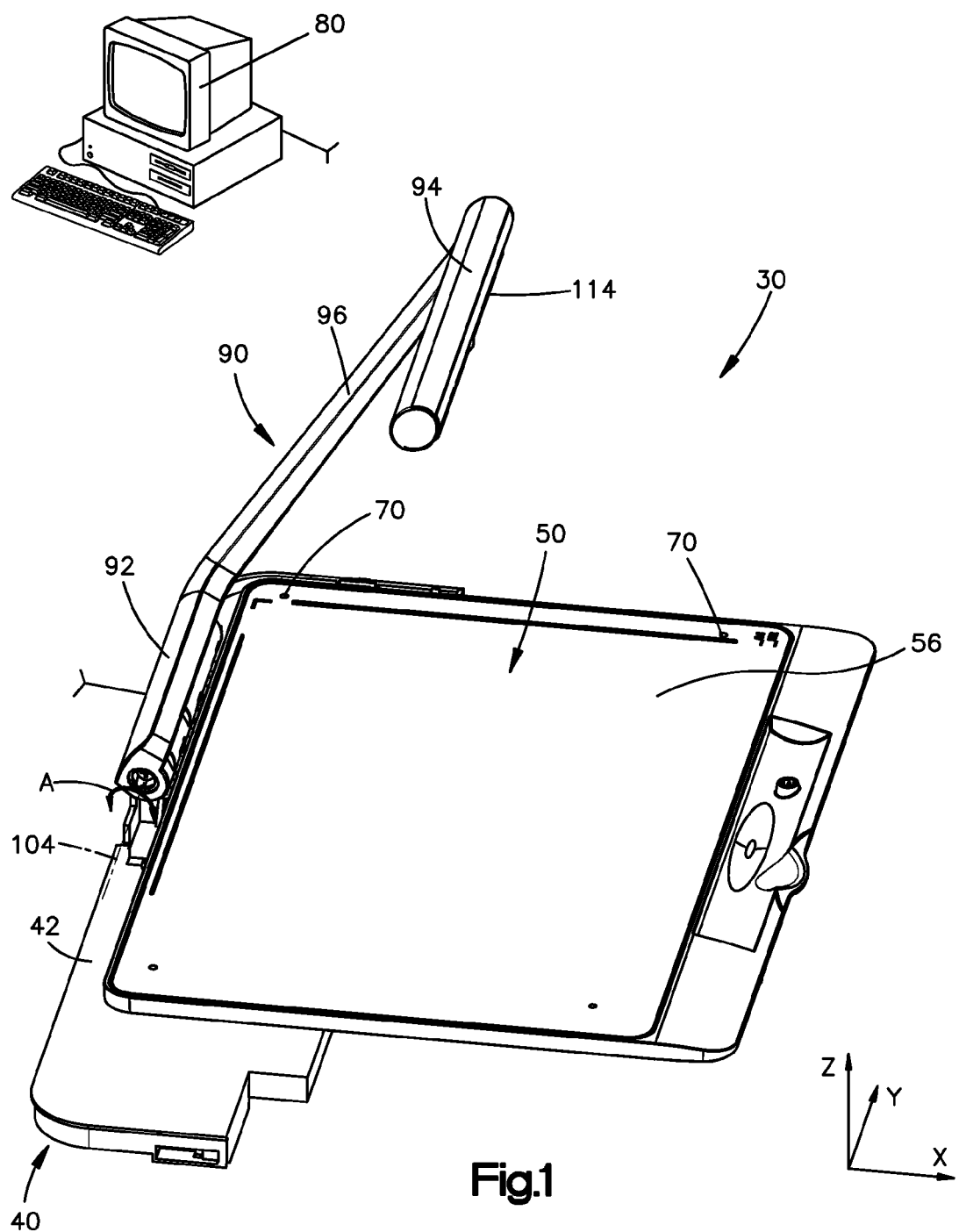
FIG. 1 is a schematic illustration of an example alignment device.

This disclosure relates to image capture devices and, more particular, relates to a system to facilitate alignment for a digital image capture device on a printing engine. FIG. 1 illustrates an example of an alignment system 30. The alignment system 30 is used in a multifunction printing device 40 that cooperates with a capture stage 50 and an image capture device 150. The capture stage 50 presents objects to be imaged by the capture device 150, which is positioned overhead of the capture stage and secured to a support arm 90 pivotally connected to the print device 40. The alignment system 30 is configured to ensure that the capture device 150 maintains a precise position relative to the capture stage 50 to enable documents and three-dimensional objects placed on the capture stage to be accurately imaged or scanned by the capture device. The alignment system 30 can be used in the manufacturing setting by a manufacturing operator, although it is contemplated that other users, e.g., the end user of the alignment system, may likewise utilize the alignment system and methods disclosed herein.

The print device 40 may constitute a conventional print tray or scanner that presents documents or 3D objects in a direction that faces upward toward the overhead capture device 150 to be imaged or scanned. The print device 40 includes a platform or base 42 that supports the capture stage 50 and the alignment system 30 for pivotable movement relative to the capture stage.

Referring to FIG. 2, the capture stage 50 extends from a first end 52 to a second end 54. The capture stage can be made of a durable material such as plastic or metal. The capture stage 50 includes a planar surface 56 that extends generally in the x-y plane of an x-y-z coordinate system. The x-direction of the coordinate system extends generally along the length of the planar surface 56, i.e., from the first end 52 to the second end 54. The y-direction extends perpendicular to the x-direction and defines the width or depth of the planar surface 56. The z-direction extends perpendicular to the x-y plane and defines a vertical distance away from the x-y plane (see FIG. 1). The planar surface 56 is illustrated as rectangular but may alternatively have another shape such as square, triangular, circular, etc. The planar surface 56 can include a series of reference markers 70 for aligning the capture device 150 relative to the capture stage 50. The surface 56 may be white, clear or opaque.

The reference markers 70 are illustrated as black or darkened spots located generally at each corner of the planar surface 56 of the capture stage 50. Although the reference markers 70 are illustrated as being circular it will be appreciated that the reference markers could be other shapes, such as square, rectangular, triangular, etc. Furthermore, although four reference markers 70 are illustrated in the example of FIG. 2, more or fewer reference markers may be provided in any pattern or configuration.

As shown in FIG. 2, the reference markers 70 include a first reference pair 72 and a second reference pair 74. The markers of the first reference pair 72 are positioned at the ends 52, 54 of the planar surface 56 at a first position along the y-axis. The reference markers in the first reference pair 72 are spaced apart from one another along the x-axis by a first predetermined distance $d_1$. The markers of the second reference pair 74 are positioned at the ends 52, 54 of the planar surface 56 at a second position along the y-axis that is spaced from the first reference pair 72 by a second predetermined distance $d_2$ along the y-axis. The reference markers in the second reference pair 74 are spaced apart from one another along the x-axis by the first predetermined distance $d_1$. In other words, two reference markers 72, 74 share the first position along the y-axis and two reference markers 72, 74 share the second position along the y-axis different from the first position. The first predetermined distance $d_1$ and the second predetermined distance $d_2$ may be equal or unequal to one another such that the reference markers 72, 74 exhibit a square or rectangular shape in the planar surface 56 of the capture table 50.

Figure 3A:
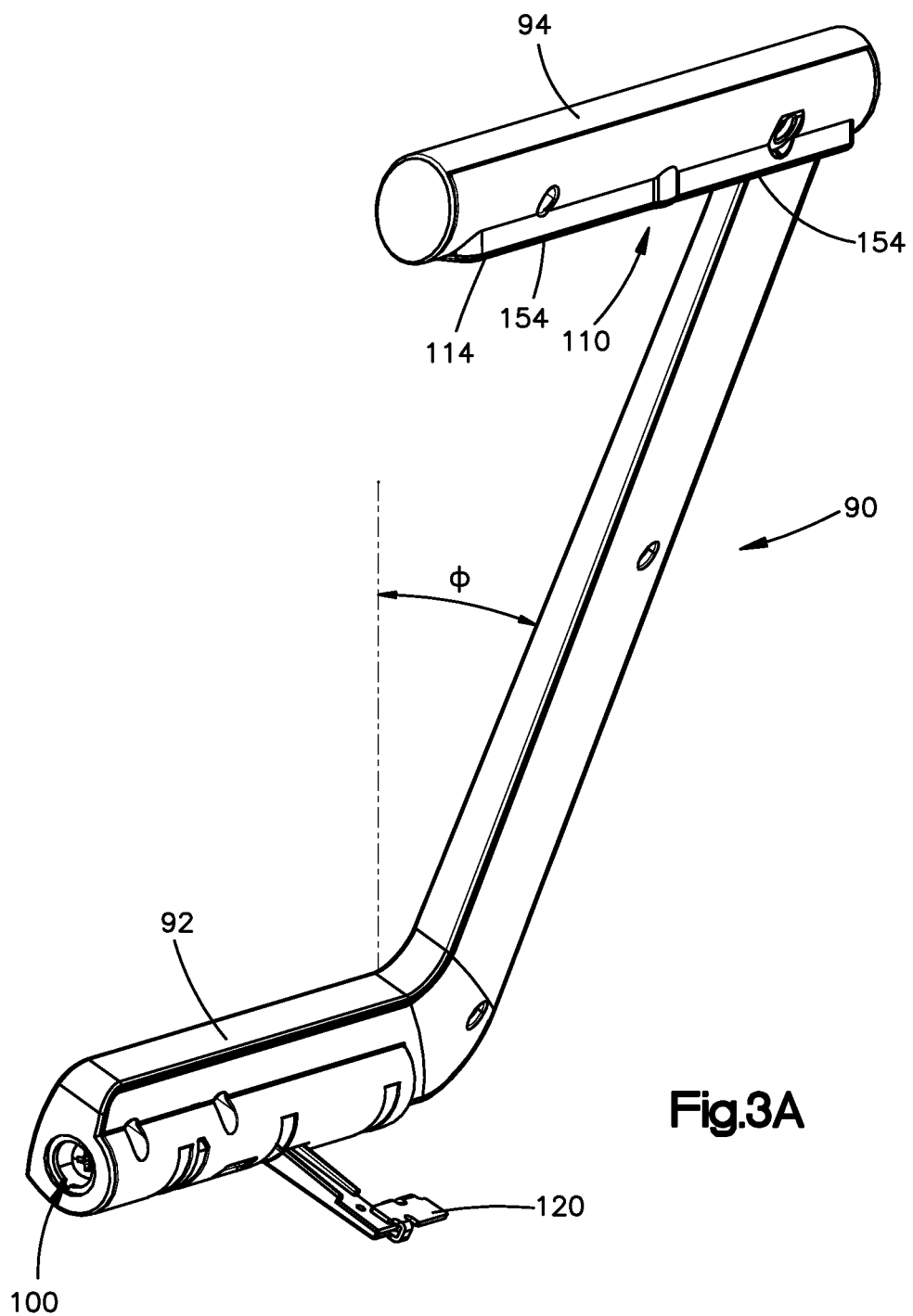
FIG. 3A is an isometric view of a support arm of the alignment device of FIG. 1.
Figure 3B:
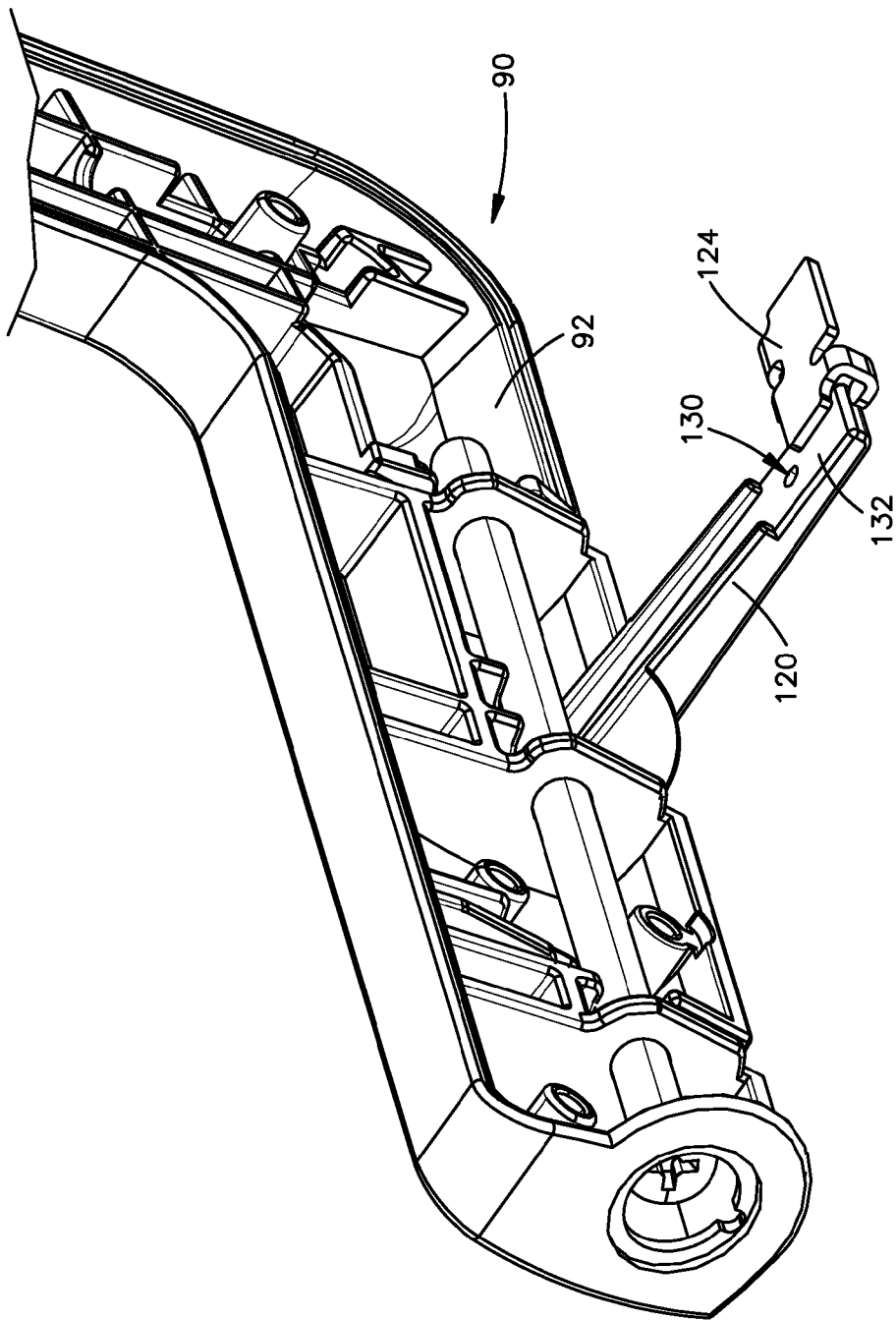
FIG. 3B is an enlarged view of a first leg of the support arm of FIG. 3A.

Referring to FIG. 3A, the support arm 90 for the capture device 150 includes a first leg 92, a second leg 94, and a connecting leg 96 that extends between the first and second legs. Collectively, the legs 92-96 form a substantially U-shaped support arm 90. The first and second legs 92, 94 extend substantially parallel to one another. The connecting arm 96 is angled relative to the first and second legs 92, 94 at an angle of, for example 13°, although alternative angles between the legs are contemplated. The first leg 92 includes an opening 100 that receives a hinge pin (not shown) for pivotally connecting the support arm 90 to the base 42 of the print device 40 (see FIG. 1). Referring to FIG. 3B, an extension 120 extends from the first leg 92 and includes a top surface 132. A shim holder 124 can be secured to the extension 120 and may be substantially U-shaped. As an example, the shim holder 124 is formed of a magnetic material, such as metal. An opening 130 extends entirely through the extension 120.

Figure 3C:
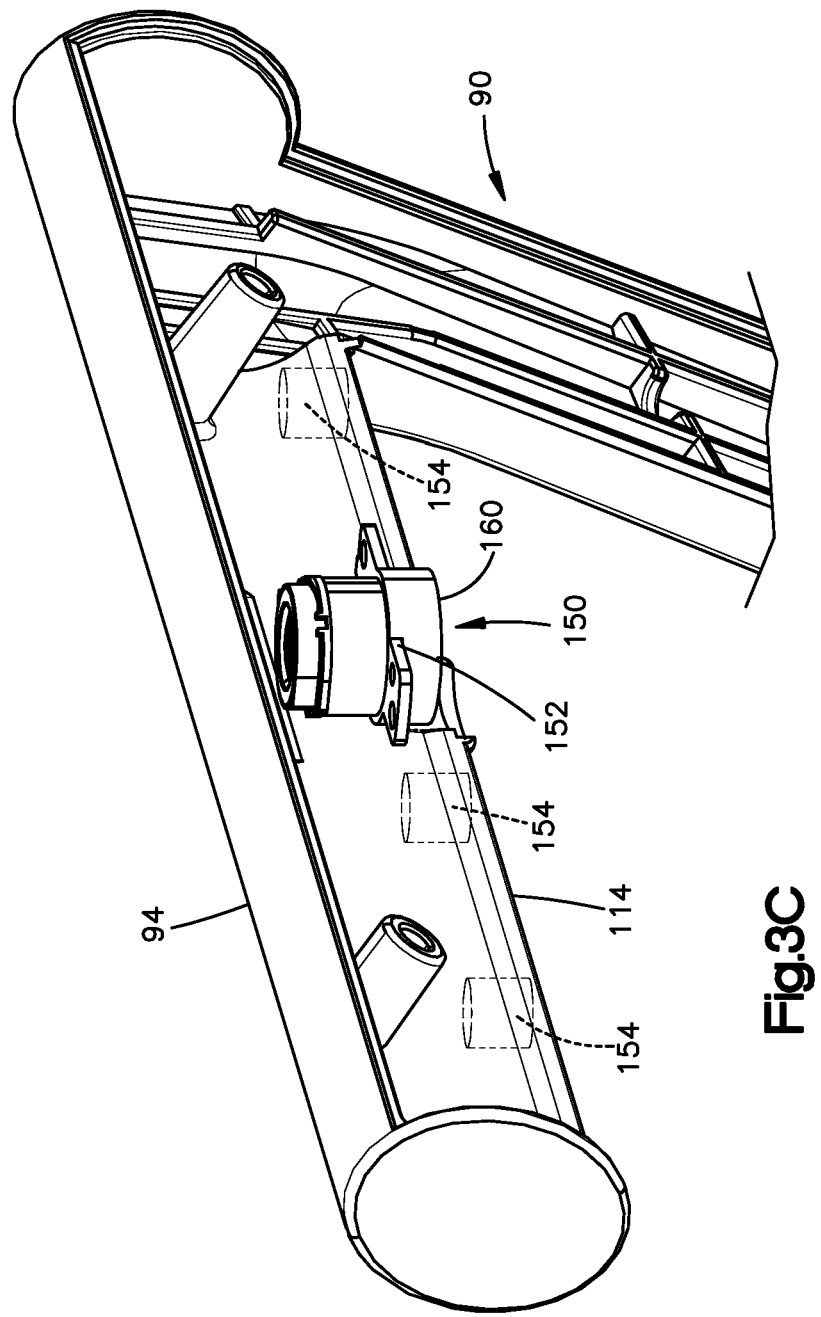
FIG. 3C is an enlarged view of a second leg of the support arm of FIG. 3A.

Referring to FIG. 3C, the second leg 94 includes an opening or aperture 110 (see FIG. 3A) that receives the capture device 150. The second leg 94 further includes a planar surface 114 that defines plane extending generally in the x-y plane when the alignment system 30 is secured to the print device 40.

The capture device 150 constitutes a camera, such as a digital camera module or scanner. The second leg 94 also contains a plurality of LED lights 154 for helping to illuminate the planar surface 56 of the capture stage 50. Alternatively, the LED lights 154 may be omitted and only ambient light used (not shown). The lens of the camera 152 includes a front portion or surface 160 that is planar. The planar surface 160 can be co-planar with or parallel to the planar surface 114 of the second leg 94 of the support arm 90. In other words, the planar surface 160 of the camera 152 is generally aligned along the planar surface 114 of the second arm 94. The camera 152 is rigidly secured to the second leg 94 such that the planar surface 160 of the camera remains co-planar with or parallel to the planar surface 114 of the second leg when the support arm 90 pivots relative to the print device 40 and capture stage 150.

Figure 4:
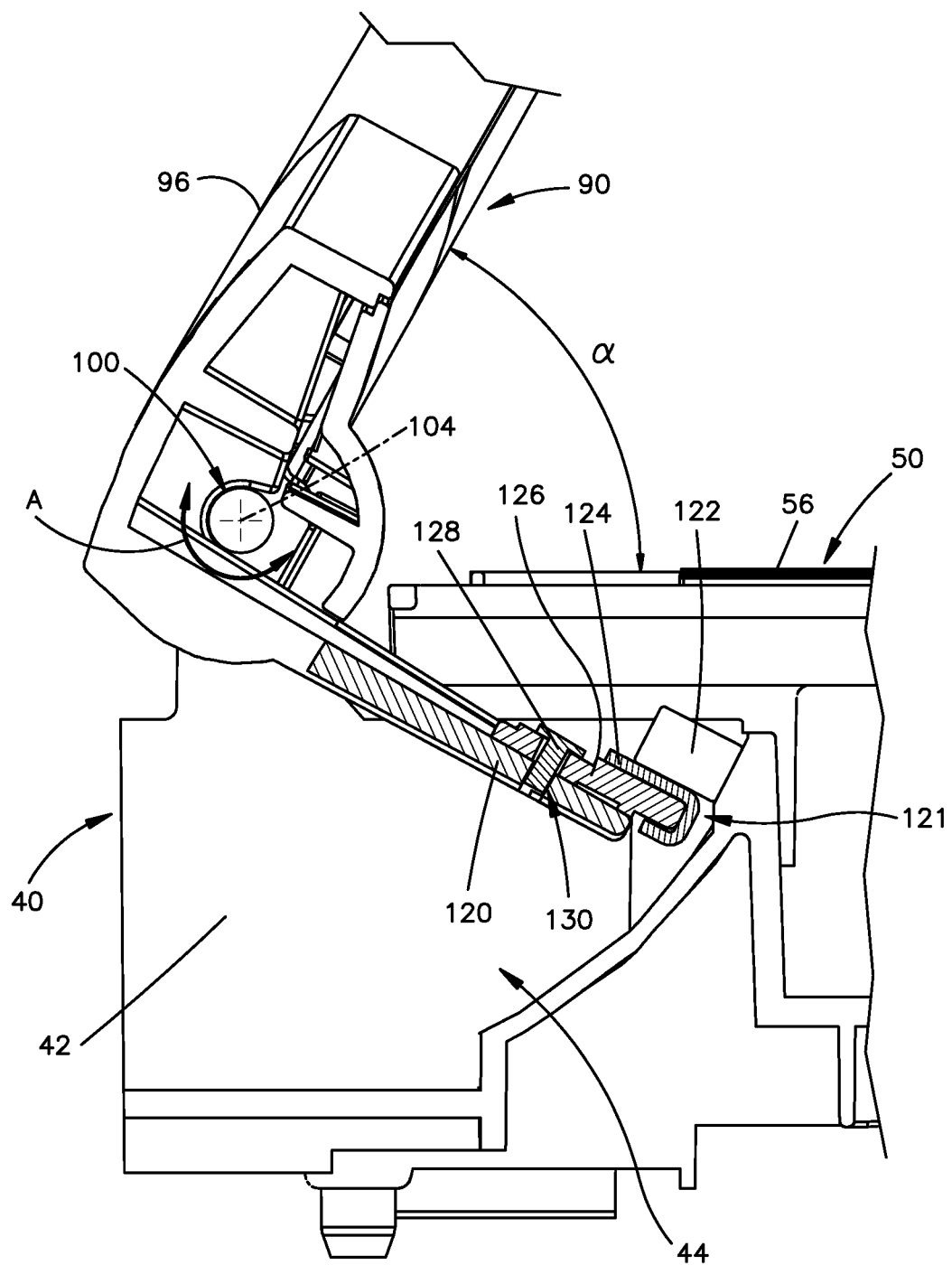
FIG. 4 is a sectional view of the alignment device of FIG. 1 without adjustment.

Referring to FIG. 4, in use, a pin (not shown) is inserted through the opening 100 of the first leg 92 and a portion of the base 42 of the print device 40 to pivotally secure the first arm 90 to the print device. The support arm 90 is pivotable about an axis 104 of the pin in the direction indicated generally at "A" (see also FIG. 1). The axis 104 extends generally in the y-direction and, thus, the axis is substantially parallel to a line connecting each pair 72, 74 of reference markers 70. In this configuration, the extension is positioned within a recess 44 of the base 42 of the print device 40, which orients the second leg 94 of the support arm 90 above the planar surface 56 of the capture stage 50 in the z-direction.

The capture device 150 has a first, inoperable position in which the support arm 90 is rotated downwards towards the capture stage 50 for easier access for maintenance, storage, etc. The capture device 150 has a second, operating position in which the support arm 90 is rotated upward away from the capture stage 50 and ready to take pictures of the capture stage. The support arm 90 is configured to lock at an angle α relative to the capture stage 50 when the support arm is placed in the second position (see FIG. 4). The angle α between the support arm 90 and the capture stage 50 depends on the particular configuration of the print device 40 that is used. In any case, the angle α places the downward-facing planar surface 160 of the camera 152 in a substantially parallel relationship with the planar surface 56 of the capture table 150. In one example, the angle α is about 60.9°, although the angle could be greater or less in other examples.

Referring to the example of FIG. 4, a magnetic lock mechanism 121 is used to maintain the support arm 90 in the upright, second position. The lock mechanism 121 includes a nominal shim 126 positioned in the shim holder 124 atop the surface 132 of the extension 120. A fastener 128 extends through the nominal shim 126 and the opening 130 in the extension to hold the nominal shim in place. A magnet 122 can be secured within or adjacent to the recess 44 in the base 42 of the print device 40. The shim holder 124, which is magnetic and secured to the extension 120, is releasably engageable with the magnet 122 in order to selectively maintain the support arm 90 in the second position. The nominal shim 126 is sized to place the support arm 90 at the angle α relative to the planar surface 56 when the shim holder 124 is magnetically coupled to the magnet 122. Consequently, the planes 56, 160 maintain a substantially parallel relationship with one another.

By way of example, the manufacturing tolerances in the print device 40, support arm 90, and lock mechanism 121 can place the support arm at the angle α, which can be adapted for a given application. One or more components, however, may be out of tolerance or damaged and, thus, the desired angle α is not achieved, thereby placing the planes 56, 160 at an undesirable angle relative to one another. Accordingly, the adjustment system 30 can be configured to adjust the angle of the support arm 90 relative to the capture device 50 which, in turn, adjusts the angle of the planar surface 160 of the camera 152 relative to the planar surface 56 of the capture table to establish a substantially parallel relationship between the planes 56, 160. As noted, in some examples, it is desirable to maintain the planes 56, 160 as close to parallel as possible such that when the capture device 150 images the object on the capture table 50 the image is as accurate and clear as possible while maintaining the field of view of the capture device on the capture table.

In use, the manufacturing operator initiates a position check of the capture device 150 relative to the capture table 50 via the computer 80. With the support arm 90 locked upright in the second, operating position, the capture device 150 takes a picture of the planar surface 56 of the capture table 50 without an object thereon. More specifically, the camera 152 acquires a test image of the reference markers 70 on the capture table 50. The computer 80 can be programmed to examine the test image and measure the distance between the centers of the first reference pair 72 of the reference markers 70 in the x-direction and generate a first measured distance. The computer 80 can also use the test image to measure the distance between the centers of the second reference pair 74 of the reference markers 70 in the x-direction and generate a second measured distance. The first and second measured distances are therefore substantially perpendicular to the axis 104 about which the support arm 90 rotates. The first and second measured distances are compared to the first predetermined distance $d_1$. For example, the first predetermined distance $d_1$ is subtracted from the first measured difference to yield a first correction difference. The first predetermined distance $d_1$ can also be subtracted from the second measured difference to yield a second correction difference.

When the support arm 90 is under-rotated, i.e., less than the desired angle α, the planar surface 56 of the capture stage 50 can be distorted trapezoidally such that the first reference pair 72 appear to be farther apart from one another in the x-direction than the second reference pair 74. In this condition, the first measured distance is greater than the first predetermined distance $d_1$ and the second measured distance is less than the first predetermined distance. Similarly, when the support arm 90 is over-rotated, i.e., more than the angle α, the planar surface 56 of the capture stage 50 is distorted trapezoidally such that the second reference pair 74 appear to be farther apart in the x-direction from one another than the first reference pair 72. In this condition, the first measured distance is less than the first predetermined distance $d_1$ and the second measured distance is greater than the first predetermined distance. Accordingly, a first correction difference that is non-zero and positive (corresponding with a second correction difference that is non-zero and negative) corresponds with an under-rotated support arm 90. Likewise, a first correction difference that is non-zero and negative (corresponding with a second correction difference that is non-zero and positive) corresponds with an over-rotated support arm 90.

The computer can be programmed to compare the correction differences to a threshold or specified range and, if either or both of the correction differences are within the range, the operator can be notified that the support arm 90 and, thus, the capture device 150 is properly aligned with the capture stage 50. If the correction differences are out of the specified range, the alignment system 30 can utilize the correction differences to determine the extent to which the support arm 90 is under-rotated or over-rotated. In the illustrated example, both the first and second correction differences are used for calculations. Alternatively, only the first correction difference or only the second correction difference is used for subsequent calculations.

As a further example, the first and second correction differences are fed into a mathematical formula derived in conjunction with the mechanical design of the print device 40 and support arm 90. For example, each possible combination of various print devices 40 and support arms 90 may have a different geometric configuration and, thus, different spatial relationships to one another and to the capture stage 50. Accordingly, the height of the capture device 150 above the planar surface 56 of the capture stage 50 in the z-direction and the placement of the capture device within the x-y plane relative to the planar surface can all factor into the particular predetermined distances, the measured distances, and, consequently, the correction differences. Therefore, a particular mathematical formula can be generated for each print device 40 and support arm 90 combination that exhibits a different spatial configuration. In any case, the mathematical formula uses the correction differences to determine the angle of the support arm 90 and, more specifically, determine the angle of the connecting leg 96 relative to the planar surface 56 of the capture stage 50.

Figure 5:
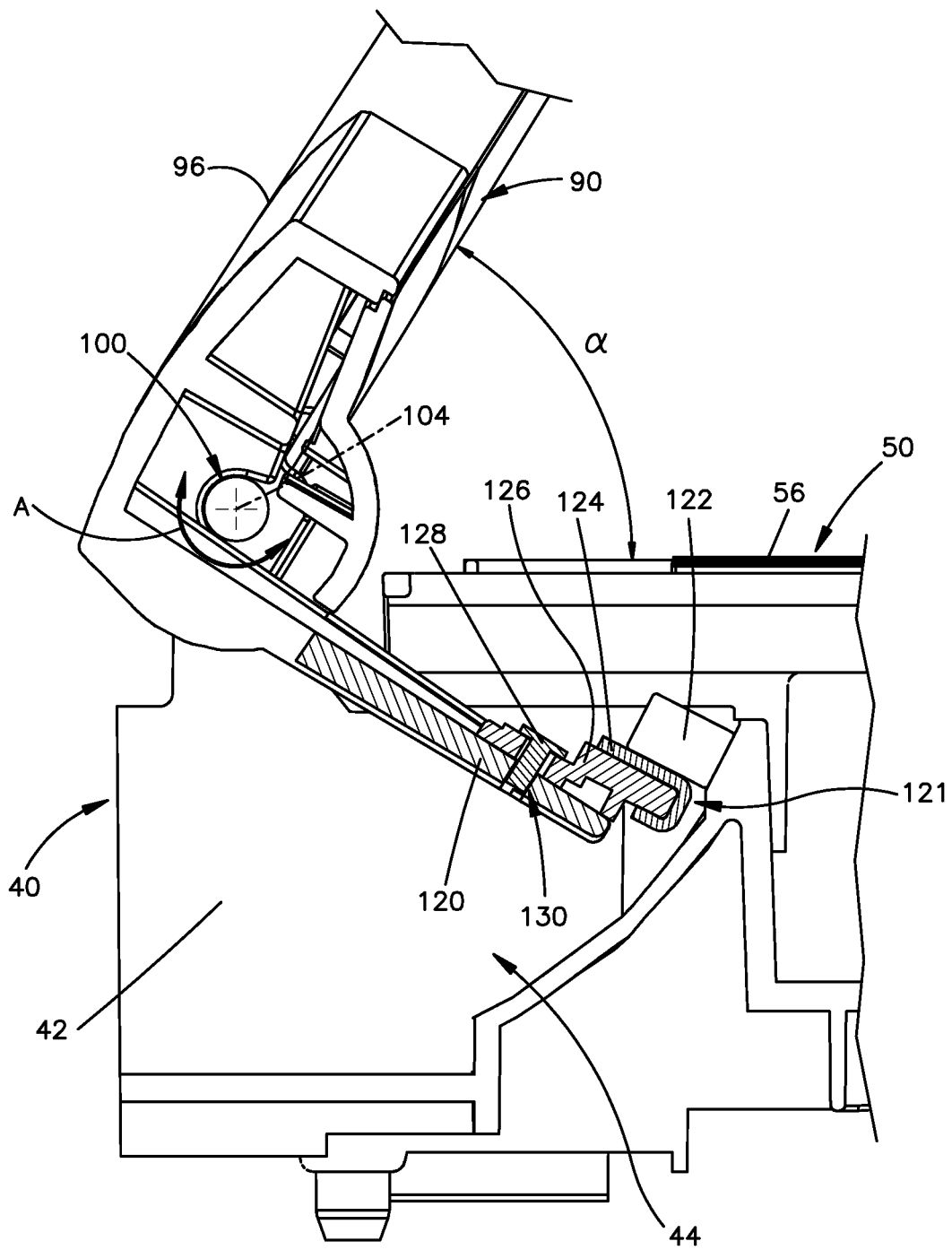
FIG. 5 is a section view of the alignment device of FIG. 1 following angular adjustment for under-rotation.
Figure 6:
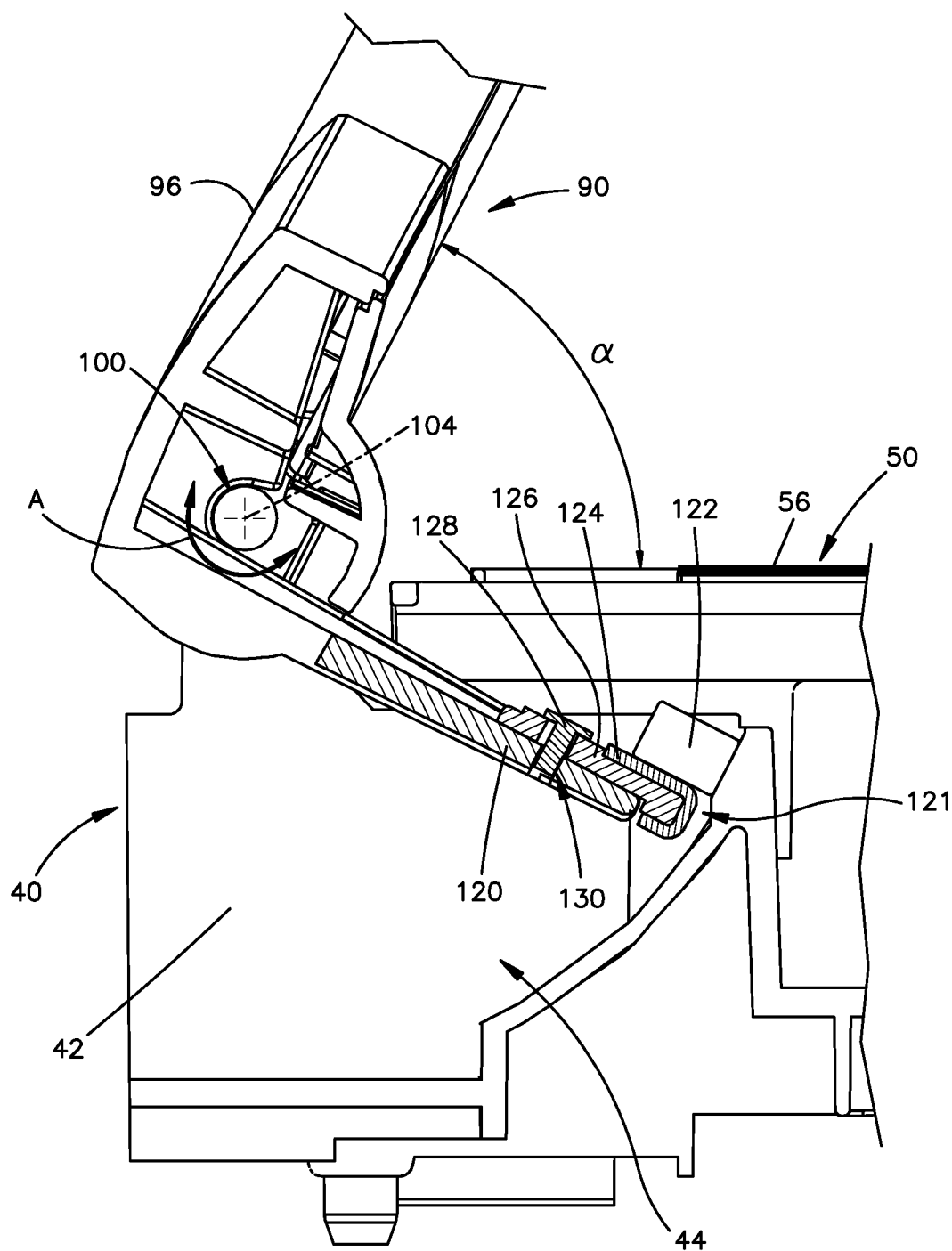
FIG. 6 is a section view of the alignment device of FIG. 1 following angular adjustment for over-rotation.

By way of example, the computer 80 includes a lookup table that correlates calculated support arm 90 angles to desired spacer shims 128 that are used to mechanically correct under-rotation or over-rotation of the support arm relative to the capture stage 50. The gradation between different shims 128 may be in whole degrees or more finely separated into partial degrees, depending on the desired precision of the correction required. In any case, after the mathematical formula generates the measured support arm 90 angle, the angle is compared to the lookup table and an appropriate size for the shim 128 is selected based on the measured angle. The computer 80 can generate an output that identifies the size of the corrective shim 128 size. For example, the computer can report the correct size to the operator of the alignment system 30 via a visual display and/or audible means. The operator can remove the nominal shim 126 from the shim holder 124 and replaces it with the appropriate corrective shim 128, securing it in place against the top surface 132 of the extension 130 with the fastener 128. The corrective shim 128 adjusts (e.g., corrects) the angle between the support arm 90 and the planar surface 56 of the capture stage 50. Consequently, the planar surface 160 of the camera 152 is adjusted relative to the planar surface 56 of the capture stage 50 in an effort to position the planes 56, 160 substantially parallel to one another. The corrective shim 128 may correct under-rotation of the support arm 90 by further rotating the support arm in the counter-clockwise direction (FIG. 5) or may correct over-rotation of the support arm by further rotating the support arm in the clockwise direction (FIG. 6). In either case, the support arm 90 with the new corrective shim 128 is moved to the upright, second position and locked in place via the magnetic coupling between the shim holder 124 and the magnet 122.

After the support arm 90 is adjusted with the shim, the computer 80 can initiate the position check again, image the reference markers 70 and recalculate the first and second correction differences. This rechecking can be initiated automatically or in response to a user input. The correction difference(s) are compared to the threshold or specified range and, if the correction difference(s) are within the range, the operator is notified that the support arm 90 and, thus, the capture device 150 is properly aligned with the capture stage 50. Documents or 3D objects can then be placed on the capture table 50 and accurately and precisely scanned/imaged with the capture device 150. On the other hand, if the correction difference(s) is not within the specified range, the computer 80 notifies the operator that the support arm 90 is still under or over-rotated. Since this may be as a result of, for example, missing or damaged parts in the support arm 90 and print device 40 no further adjustments are made. Alternatively, the aforementioned process can be repeated and additional or alternative shims are used to adjust the angular position of the support arm 90 relative to the capture table 50 until the correction difference(s) fall within the specified range to indicate properly alignment of the capture device 150 with the capture stage 50. In response to such further adjustments, the planar surface 160 of the camera 152 becomes substantially parallel to the planar surface 56 of the capture stage 50.

By maintaining the planes 56, 160 in as close to a parallel relationship as possible, the alignment system 30 can help ensure that the field of view of the capture device 150 and, more specifically, the field of view of the camera 152 remains within the intended functional region for imaging the object on the capture table 50. The alignment system 30 thus facilitates that the position and angle of the planar surface 160 of the camera 152 relative to the planar surface 56 of the capture stage 50 is consistent and repeatable for both internal development and customer use.

Figure 7:
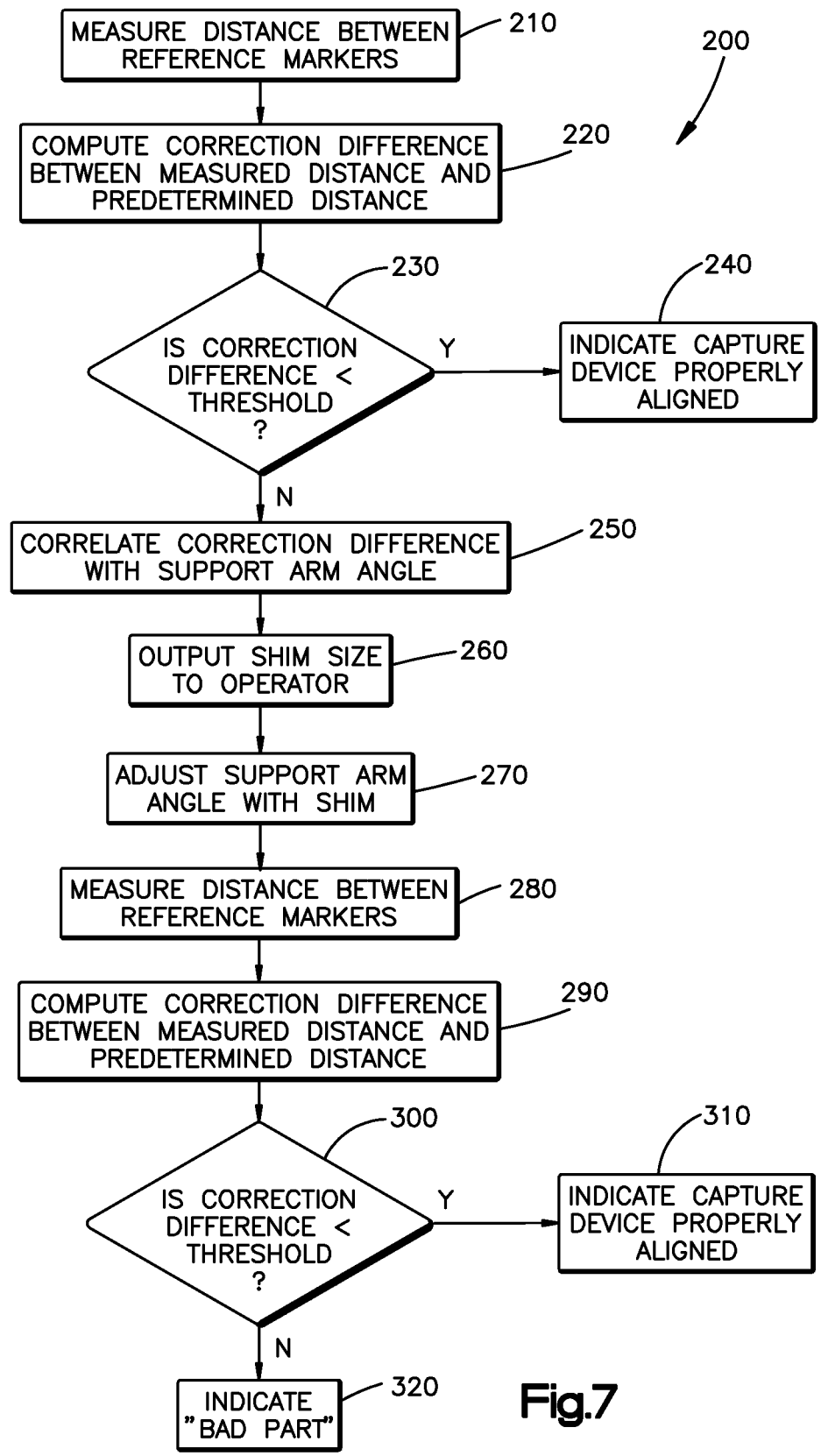
FIG. 7 is a flow chart illustrating an example method of operating the adjustment device of FIG. 1.

FIG. 7 illustrates an example of a method 200 that can be used to align the planar surface 160 of the camera 152 in a parallel relationship with the planar surface 56 of the capture device 50. At 210, the distance between one or more pairs 72, 74 of the reference markers 70 can be measured (e.g., by the computer 80 of FIG. 1). At 220, the method includes computing the difference between the measured distances of the reference pairs 72, 74 and the known, predetermined distances $d_1$ and/or $d_2$ between the reference pairs and generates a correction difference. At 230, the method includes comparing (e.g., by the computer 80) the correction difference to a specified value or range corresponding with acceptable degrees of over- and under-rotation of the support arm 90 relative to the capture stage 50. If the correction difference falls within the acceptable value or range, at 240, an output can be generated (e.g., by the computer 80) to notify the operator that the support arm 90 is angled properly relative to the capture stage 50 and ready for use.

If the correction difference falls outside the acceptable value or range, at 250 the method can include computing (e.g., by the computer 80) the angle of the support arm 90 relative to the planar surface 56 of the capture stage 50 based on a predetermined mathematical formula. At 260, a lookup table can be used (e.g., by the computer 80) to correlate the measured support arm 90 angle with the corrective shim 128 size to correct the over- or under-rotation of the support arm relative to the capture stage 50, and outputs the shim size to the operating via visual or auditory means. At 270, the operator removes the nominal shim 126 from the shim holder 124, inserts the corrective shim 128 into the shim holder 124, and secures the corrective shim to the extension 130 with the fastener 128. This can cause adjustments in the angle of the support arm 90 relative to the capture stage 50, which in turn, adjusts the position of the planar surface 160 of the camera 152 relative to the planar surface 56 of the capture stage 50.

At 280, the distance between one or more pairs 72, 74 of the reference markers 70 are measured (e.g., by the computer 80) following adjustment of the support arm 90 relative to the capture stage 50. At 290, the method includes calculating (e.g., by the computer 80) a difference between the measured distances of the reference pairs 72, 74 and the known, predetermined distances $d_1$ and/or $d_2$ between the reference pairs and generates a correction difference for the adjusted capture arm 90. At 300, the correction difference for the adjusted captured arm 90 is compared (e.g., by the computer 80) to the specified acceptable value or range of degrees of over- and under-rotation of the support arm 90 relative to the capture stage 50. If the correction difference falls within the acceptable value or range, at 310 an output is provided to notify the operator that the adjusted support arm 90 is now angled properly relative to the capture stage 50 and ready for use. If the correction difference falls outside the acceptable value or range, at 320 an output is generated to notify the operator that the adjusted support arm 90 is still out of the acceptable range and, thus, the print device 40 is unsuitable for shipping to the customer. Alternatively, after 270 the process can be repeated (not shown), starting at step 210, until the correction difference is within the specified value or range, i.e., it is determined that the planar surface 160 of the camera 152 and the planar surface 56 of the capture stage 50 are substantially parallel.

Figure 8:
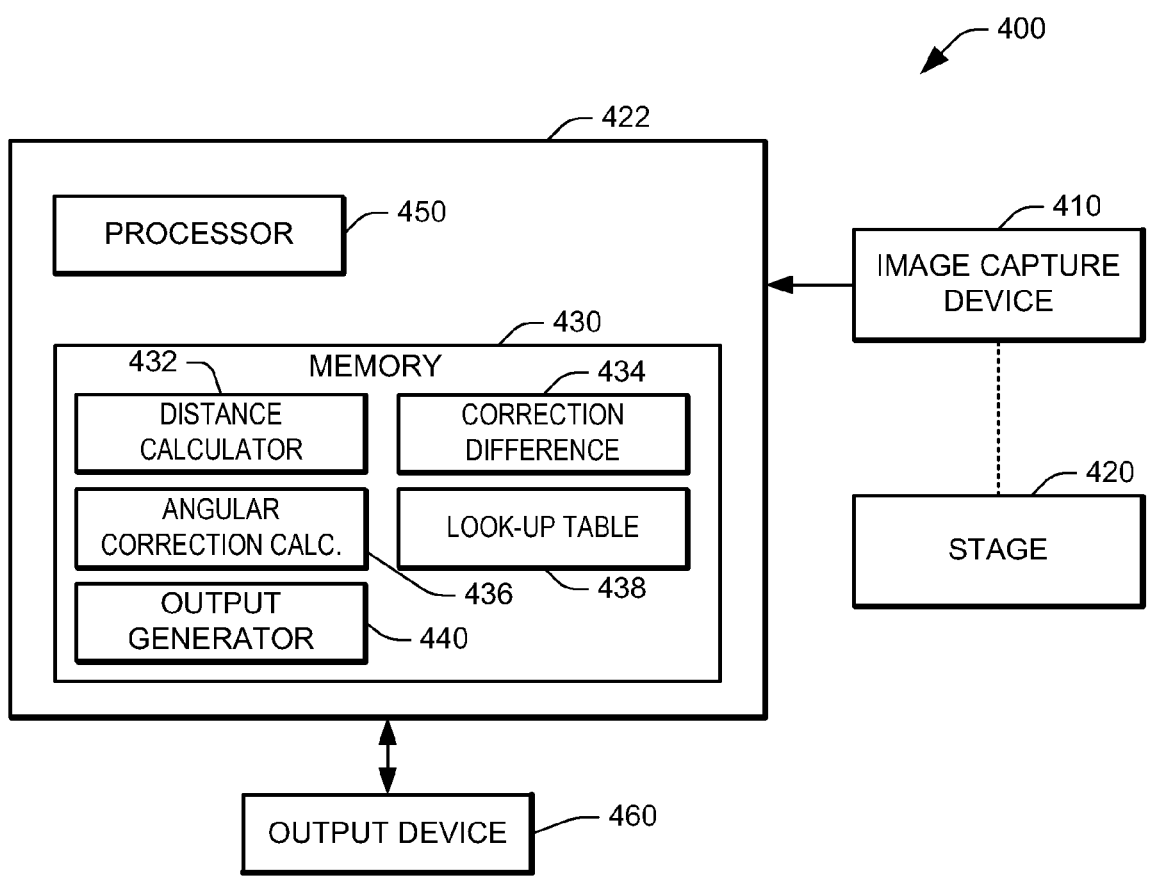
FIG. 8 illustrates an example of a system that can be implemented for facilitating alignment of the alignment device of FIG. 1.

FIG. 8 illustrates an example of a system 400 that can be used to facilitate alignment of a planar surface of an image capture device (e.g., the camera 152) 410 with the planar surface of the capture stage 420 (e.g., the capture stage 50). For example, the image capture device can correspond to the camera and the stage 420 can correspond to the capture stage 50 disclosed herein. The system 400 includes an image capture device 410 to image reference markers from the capture stage 420. The reference markers can be spaced apart by a predetermined distance as disclosed herein.

The system 400 can include a computer 422 such as corresponding to the computer 80 disclosed herein. The computer 422 can include memory 430 and a processor 450. Memory 430 can be implemented as a non-transitory computer readable media configured to store machine readable instructions. The processor 450 can access the memory 430 and execute the instructions stored therein. The instructions can include a distance calculator 432 for calculating a distance between the reference markers. A correction difference calculator 434 can be programmed to compute a correction difference between the measured distance of the reference markers and the predetermined distance. An angular correction value calculator 436 can be programmed to compute an angular correction value based on the correction difference. The memory instructions can also include a look-up table 438 that correlates the angular correction value to a mechanical shim size for aligning the camera and the capture device. The look-up table can be programmed according to the configuration and type of the camera and the capture device. An output generator 440 can be programmed to generate an output based on the angular correction value. The output can be provided to an output device 460 (e.g., computer display or the like) for viewing by the user. Thus, the output can provide an indication (e.g., a value and/or graphical representation) of a shim that can be utilized to provide for desired alignment between the capture stage and the image capture device as disclosed herein.

What have been described above are examples. It is, of course, not possible to describe every conceivable combination of components or methodologies, but one of ordinary skill in the art will recognize that many further combinations and permutations are possible. Accordingly, the invention is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. A method for aligning an image capture device for a print device comprising:
   providing a capture stage on which an object to be imaged by the capture device is placed, the capture stage including a plurality of reference markers spaced apart by a predetermined distance;
   imaging the reference markers with the capture device;
   measuring a distance between the reference markers;
   computing a correction difference between the measured distance of the reference markers and the predetermined distance;
   computing an angular correction value based on the correction difference; and
   providing a lookup table that correlates the angular correction value to one of a plurality of different sized mechanical shims;
   adjusting an angular position of the capture device relative to the capture stage based upon the angular correction value;
   wherein adjusting the angular position of the capture device comprises placing a shim of a first size from a plurality of different sized shims between the print device and a support arm secured to the capture device, the first size correlated with the angular correction value in the lookup table.

2. The method of claim 1 wherein the plurality of reference markers comprise first and second pairs of reference markers spaced apart a distance in a first direction along the capture stage, the reference markers within each first and second pair being spaced from one another a distance in a second direction along the capture stage that is perpendicular to the first direction.

3. The method of claim 1, further comprising repeating adjusting an angular position of the capture device relative to the capture stage based upon the angular correction value until the angular correction value is within a predetermined threshold.

4. The method of claim 1, wherein the capture device includes a first planar surface that faces towards the capture stage and the capture stage includes a second planar surface that faces towards the capture device, the angular position of the capture device relative to the capture stage being adjusted until the first and second planar surfaces are substantially parallel to one another.

5. The method of claim 1, wherein the angular correction value is displayed on a monitor for viewing by an operator of the capture device.

6. The method of claim 1 further comprising locking the angular position of the support arm relative to the capture stage with magnetic force.

7. A system comprising:
   an image capture device to image reference markers from a capture stage, the reference markers being spaced apart by a predetermined distance;
   memory to store instructions, which when executed by a processor cause the processor to
     calculate a distance between the reference markers;
     compute a correction difference between the measured distance of the reference markers and the predetermined distance;

compute an angular correction value based on the correction difference; and generate an output based on the angular correction value, wherein the memory further comprises a lookup table that correlates the angular correction value to one of a plurality of different sized mechanical shims to adjust the image capture device, the output being generated from the look-up table indexed according to the angular correction value;

a display to provide a visualization corresponding to the output, wherein the visualization is used to adjust the image capture device.

8. The system of claim 7, wherein the visualization includes an identification of one of a plurality of different sized shims to adjust the angular position of the capture device.

9. The system of claim 8, further comprising a set of differently sized shims to adjust the angular position of the capture device relative to the capture stage, each differently sized shim corresponding with a different angular correction value.

10. A system comprising:

a capture stage on which an object to be imaged by the capture device is placed, the capture stage including a plurality of reference markers spaced apart by a predetermined distance;

an image capture device to image the reference markers from the capture stage;

a memory to store instructions and a lookup table that correlates an angular correction value to a mechanical shim, wherein a set of differently sized mechanical shims are to adjust an angular position of the capture device relative to the image capture stage, each of the differently sized mechanical shims corresponding with a different angular correction value;

a processor to access the instructions from the memory, the instructions comprising:

a distance calculator to calculate a distance between the reference markers;

a difference calculator to compute a correction difference between the measured distance of the reference markers and the predetermined distance;

a correction calculator to compute an angular correction value based on the correction difference; and an output generator to generate an output based on the angular correction value, wherein the output is used to adjust the angular position of the image capture device relative to the capture stage.

11. The system of claim 10, wherein the output comprising an identification of a selected one of the differently sized shims.

* * * * *